(12) United States Patent
Sylvain (10) Patent No.: US 8,364,167 B1
(45) Date of Patent: Jan. 29, 2013

(54) PROVIDING LOCATION INFORMATION FOR A MOBILE TERMINAL FROM A WIRELESS TELEPHONE SERVICE PROVIDER

(75) Inventor: Dany Sylvain, Gatineau (CA)

(73) Assignee: Apple Inc., Cupertino, CA (US)

( * ) Notice: Subject to any disclaimer, the term of this patent is extended or adjusted under 35 U.S.C. 154(b) by 744 days.

(21) Appl. No.: 12/343,310

(22) Filed: Dec. 23, 2008

(51) Int. Cl.
*H04W 24/00* (2009.01)

(52) U.S. Cl. ............... 455/456.1; 455/456.2; 455/456.3

(58) Field of Classification Search ............... 455/456.1, 455/456.2, 456.3
See application file for complete search history.

(56) References Cited

U.S. PATENT DOCUMENTS

| | | | | |
|---|---|---|---|---|
| 6,377,810 B1 * | 4/2002 | Geiger et al. | ............... | 455/456.2 |
| 7,016,693 B2 * | 3/2006 | Guyot | ........................ | 455/456.2 |
| 7,054,652 B2 * | 5/2006 | Luis | ............................. | 455/461 |
| 7,130,630 B1 * | 10/2006 | Enzmann et al. | .......... | 455/435.1 |
| 7,613,155 B2 * | 11/2009 | Shim | ............................. | 370/338 |
| 7,697,942 B2 * | 4/2010 | Stevens | ...................... | 455/456.1 |
| 7,844,284 B2 * | 11/2010 | Enzmann et al. | .......... | 455/456.5 |
| 2003/0210683 A1 * | 11/2003 | Bais et al. | ....................... | 370/352 |
| 2004/0137918 A1 * | 7/2004 | Varonen et al. | ............. | 455/456.2 |
| 2004/0248587 A1 * | 12/2004 | Niemenmaa | ................ | 455/456.1 |
| 2005/0125493 A1 * | 6/2005 | Chaskar et al. | ............... | 709/203 |
| 2006/0046744 A1 * | 3/2006 | Dublish et al. | .............. | 455/456.3 |
| 2006/0211432 A1 * | 9/2006 | Kokkonen et al. | .......... | 455/456.2 |
| 2006/0258371 A1 * | 11/2006 | Krishnamurthi et al. | .. | 455/456.1 |
| 2007/0124796 A1 * | 5/2007 | Wittkotter | ...................... | 725/136 |
| 2008/0268871 A1 * | 10/2008 | Kim et al. | .................. | 455/456.2 |
| 2009/0024698 A1 * | 1/2009 | Ho et al. | ........................ | 709/203 |

* cited by examiner

*Primary Examiner* — Jinsong Hu
*Assistant Examiner* — Magdi Elhag
(74) *Attorney, Agent, or Firm* — Meyertons, Hood, Kivlin, Kowert & Goetzel, P.C.

(57) ABSTRACT

Location information for a mobile terminal is made available by a wireless telephone service provider once a location request is authorized by the user of the mobile terminal. The present invention facilitates sharing of the location information for the mobile terminal with any web server that is capable of providing location based services.

24 Claims, 8 Drawing Sheets

PROVIDING LOCATION INFORMATION FOR A MOBILE TERMINAL FROM A WIRELESS TELEPHONE SERVICE PROVIDER

FIELD OF THE INVENTION

The present invention relates to communications, and in particular to providing location information for a mobile terminal from a wireless telephone service provider to a web server to allow the web server to provide location based services directly for the mobile terminal.

BACKGROUND OF THE INVENTION

The convergence of cellular communications and the Internet has led to mobile terminals that support voice communications and provide access to the Internet being ubiquitous. It is now commonplace for users of these mobile terminals to access web-based services and retrieve various types of information, ranging from local weather reports and news to movie listings and restaurant locations. The information available through the Internet is seemingly unlimited. In many instances, the location of the user can be used to tailor the information provided to the user in response to a query. A search for a movie listing, restaurant location of a regional chain, weather report, or the like is generally much more useful when the information returned to the user has taken the user's location into consideration, since a user is often most interested in movies, restaurant locations, weather, and the like that are close to their current location. Even when a user isn't aware that location specific information may be available in response to certain queries, many web-based service providers are capable of providing more pertinent information in response to these queries when the location of the user is known.

Communication service providers, such as wireless telephone service providers, generally have ready access to the current locations of the mobile terminals that they support. The communication networks that provide the mobile communication services almost always have access to information identifying the cell that is currently serving a particular mobile terminal. Based on the cell's identity, the location of the mobile terminal, and thus the location of the user can be determined. Depending on the size of the cell, a location of the mobile terminal may be determined within a few miles of the actual location of the mobile terminal. When the mobile terminal is equipped with a Global Positioning Satellite (GPS) receiver, very precise location coordinates may be measured by the mobile terminal and uploaded to location servers that are provided in the communication service provider's network. Further, three or more base stations that are within communication range of the mobile terminal may employ triangulation techniques to determine a precise location of the mobile terminal. Regardless of technique, the communication service providers have access to relatively precise location information for a mobile communications device at any given time.

Although communication service providers generally have ready access to the current locations of mobile terminals, the location information that is obtained by the communication service providers is not readily accessible by web-based service providers that are not affiliated with the communication service providers. Without being provided the location information by the user, it is generally difficult if not impossible for web-based service providers to determine the current location of the user. As such, web-based service providers must respond to queries without information bearing on the current location of the user, unless the user specifically provides location information in association with a search.

Accordingly, there is a need for an efficient and effective technique to allow communication service providers to provide location information bearing on the location of a mobile terminal to web-bases service providers. There is a further need to provide the location information to the web-based service providers in association with a user sending a query to the web-based service providers. There is still a further need to allow such sharing of the location information in a secure and authorized manner.

SUMMARY OF THE INVENTION

Location information for a mobile terminal is maintained by a wireless telephone service provider. The present invention facilitates sharing of the location information for the mobile terminal with a web server, which is capable of providing location based services via the mobile terminal. In one embodiment, a mobile terminal will submit a service request for a location based service to a web server. To obtain the location of the mobile terminal, the web server will direct a location request toward a location authorization function provided by the wireless telephone service provider. The location authorization function will obtain authorization to provide location information for the mobile terminal to the web server by sending an authorization message to the mobile terminal. If the user or mobile terminal provides authorization to share the location information with the web server in response to the authorization request, the location authorization function will obtain and send the requested location information for the mobile terminal to the web server. The web server may then process the service request in light of the location information and provide an appropriate location based service for the mobile terminal in response to the original service request. The response may include providing a web page with content selected at least in part based on the location of the mobile terminal.

In one embodiment, the authorization message is provided to the mobile terminal via a short message service (SMS) message, which is readily received and processed by the mobile terminal. The SMS message may be accessed and viewed by the user. The web server may provide correlation information to both the mobile terminal and the location authorization function of the wireless telephone service provider. The location authorization function may include the correlation information in the authorization message that is sent to the mobile terminal. As such, the user or mobile terminal can compare the correlation information provided directly by the web server to that provided in the authorization message and determine that the authorization message is being used to obtain authorization to allow the location authorization function to provide location information to the web server to assist in responding to the initial service request. If authorized manually by the user or automatically by mobile terminal, the mobile terminal will provide an appropriate response that indicates either the user or mobile terminal has authorized the location authorization function to provide the location information for the mobile terminal to the web server. If the authorization message is an SMS message, the authorization response may be provided in a corresponding SMS message, which is sent from the mobile terminal to the location authorization function. Although SMS messaging is an efficient and effective messaging technique, other available messaging techniques may be employed for the authorization process.

In environments where multiple wireless telephone service providers, such as different wireless carriers, may support the mobile terminal, a carrier selection function may be used by the web server to identify the wireless telephone service provider associated with the mobile terminal or may be configured to route location requests provided by the web server to the location authorization function of the wireless telephone service provider associated with the mobile terminal. Further, the location based request that is directed to the web server may represent any type of information query that may be further refined based on location information. The web server is configured to process the query and retrieve information responsive to the query. If the query is refined based on location information, the web server will retrieve information that is responsive to the query in light of the location information. The request may, but need not, specifically include instructions to refine the query based on location information. If the request does not include specific instructions to refine the query with location information, the web server may automatically recognize that the query is one that will benefit from refinement based on location information and attempt to retrieve location information for the mobile terminal.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Location information for a mobile terminal is maintained by a wireless telephone service provider. The present invention facilitates sharing of the location information for the mobile terminal with a web server, which is capable of providing location based services via the mobile terminal. In one embodiment, a mobile terminal will submit a service request for a location based service to a web server. To obtain the location of the mobile terminal, the web server will direct a location request toward a location authorization function provided by the wireless telephone service provider. The location authorization function will obtain authorization to provide location information for the mobile terminal to the web server by sending an authorization message to the mobile terminal. If the user or mobile terminal provides authorization to share the location information with the web server in response to the authorization request, the location authorization function will obtain and send the requested location information for the mobile terminal to the web server. The web server may then process the service request in light of the location information and provide an appropriate location based service for the mobile terminal in response to the original service request. The response may include providing a web page with content selected at least in part based on the location of the mobile terminal.

Figure 1:
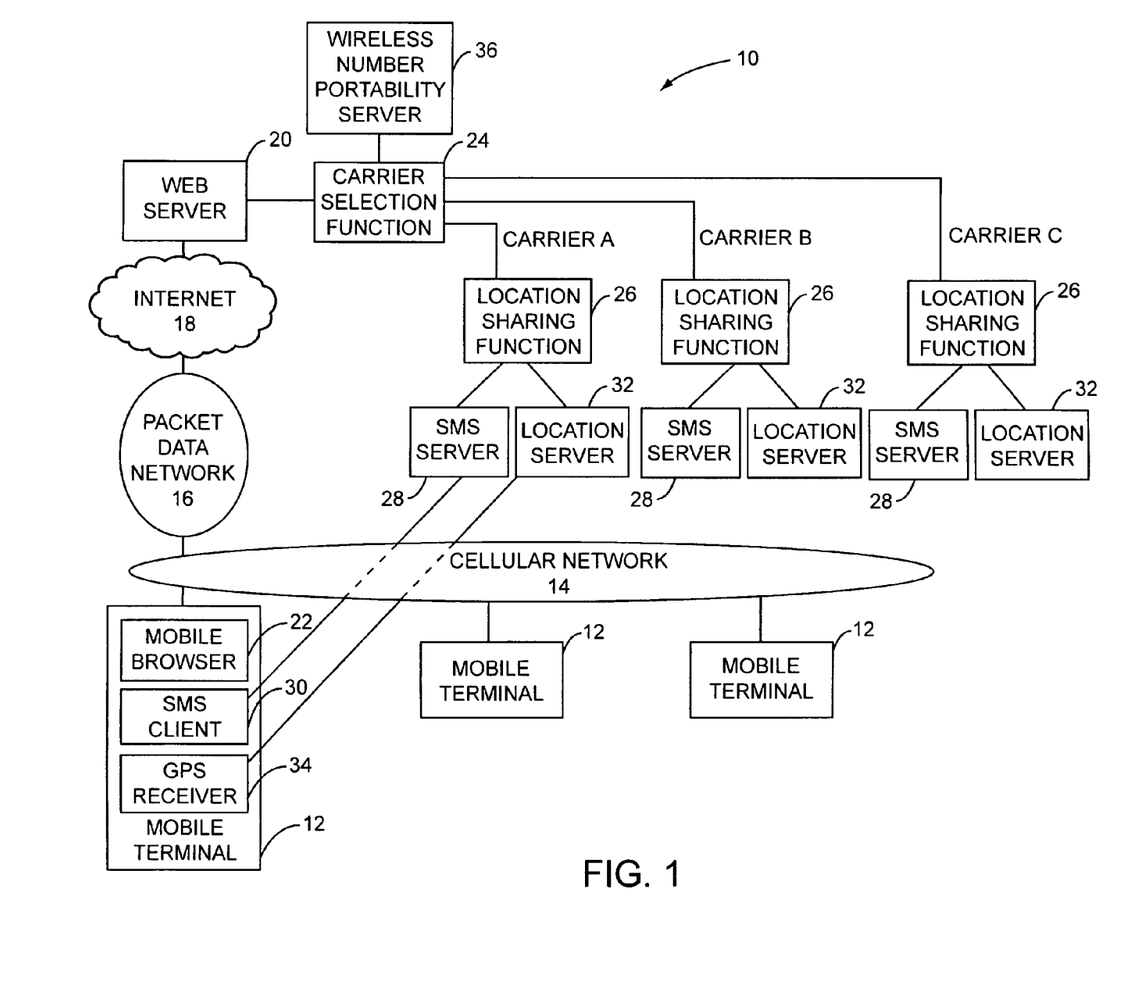
FIG. 1 is a block representation of a wireless communication environment according to one embodiment of the present invention.
Figure 2A:
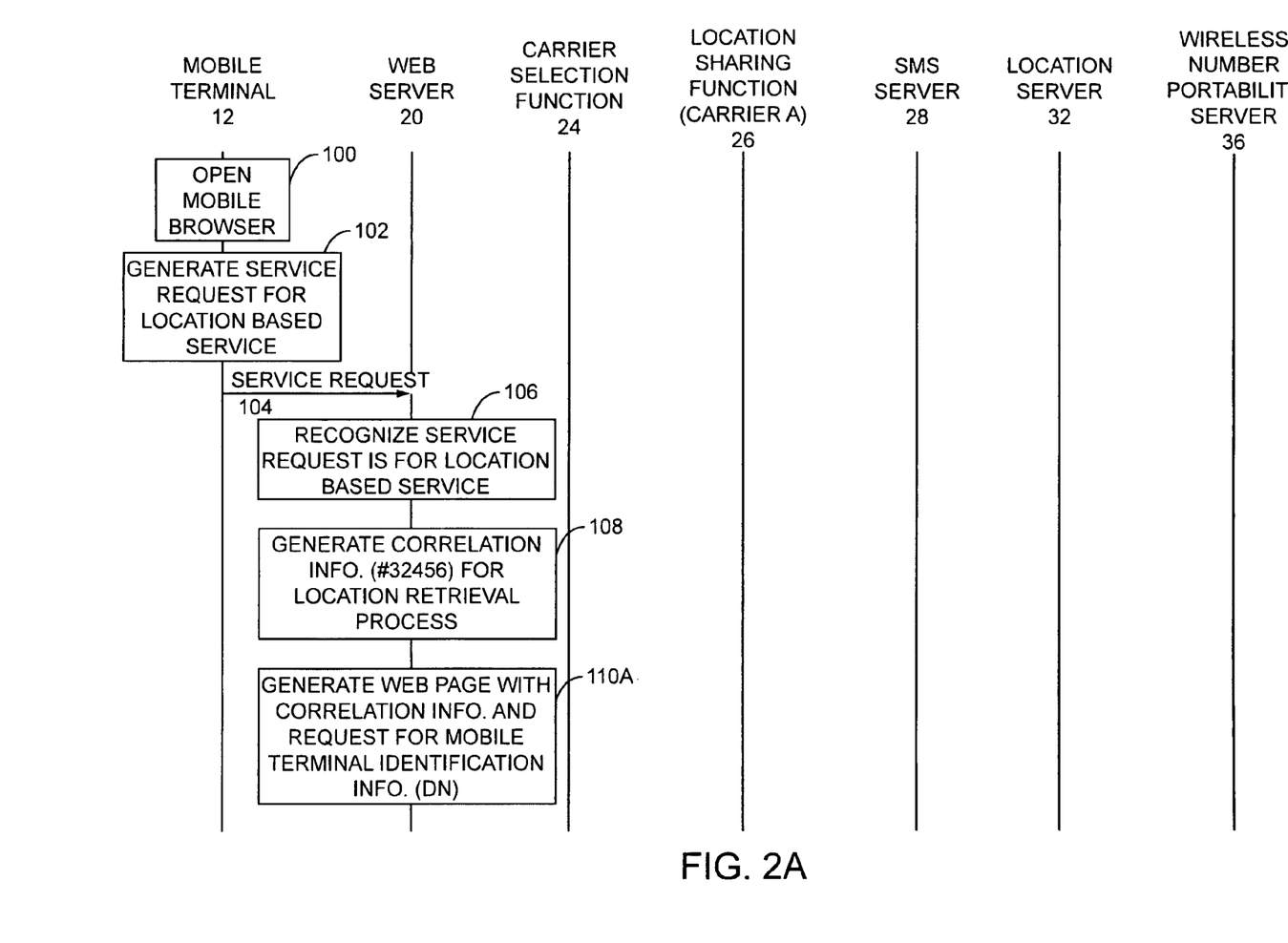
FIGS. 2A-2E are a communication flow illustrating operation of one embodiment of the present invention.
Figure 2B:
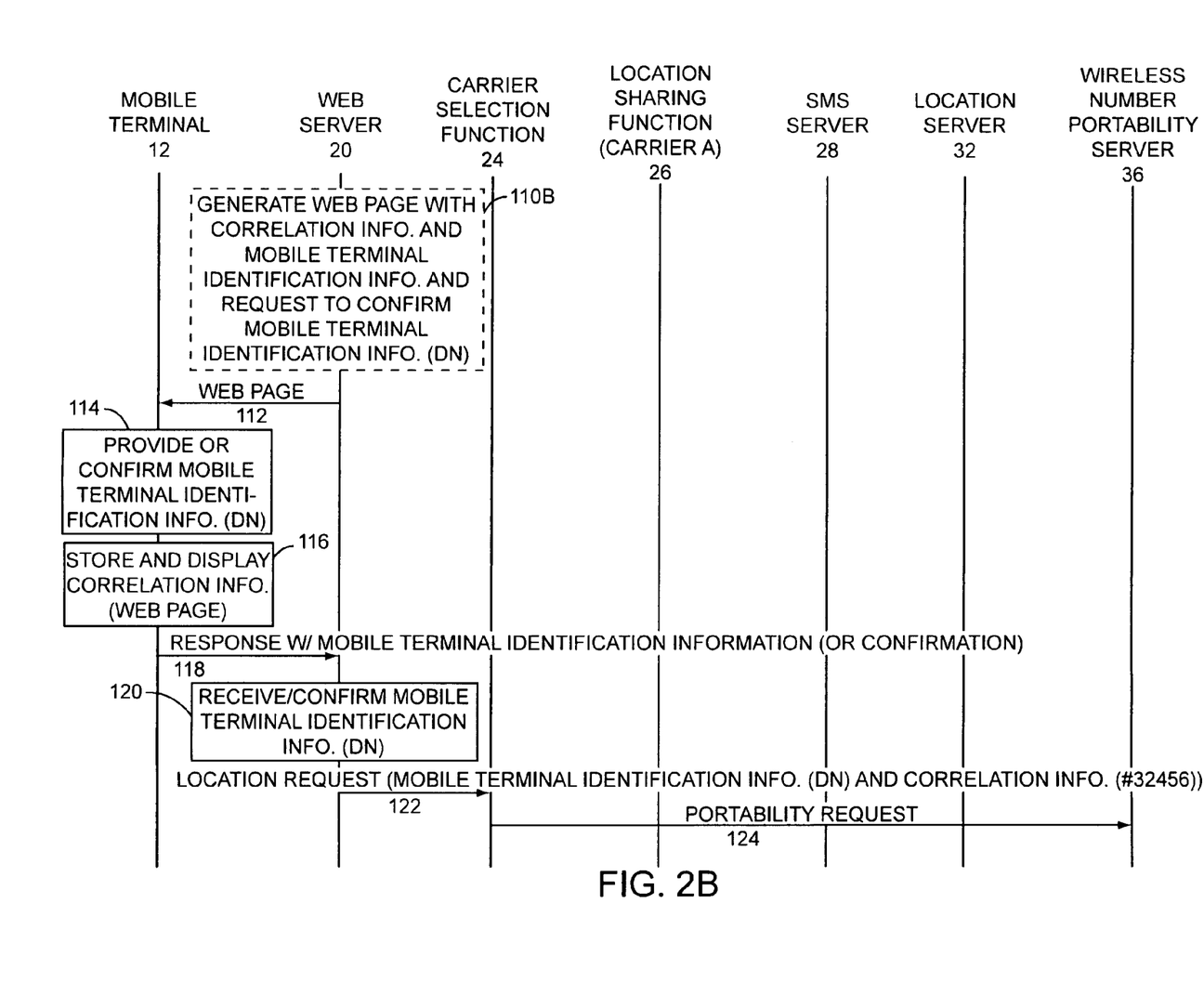
Figure 2C:
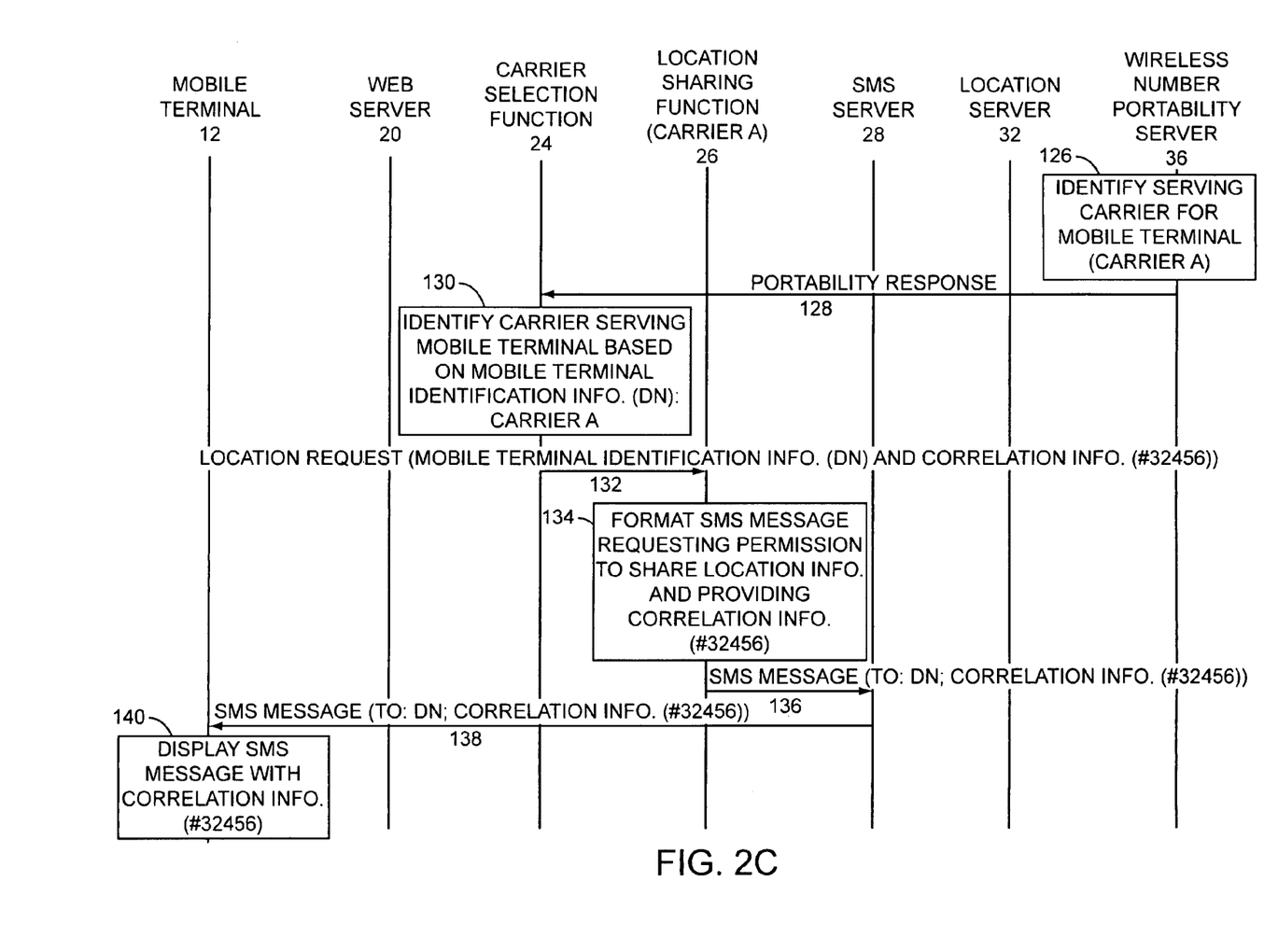
Figure 2D:
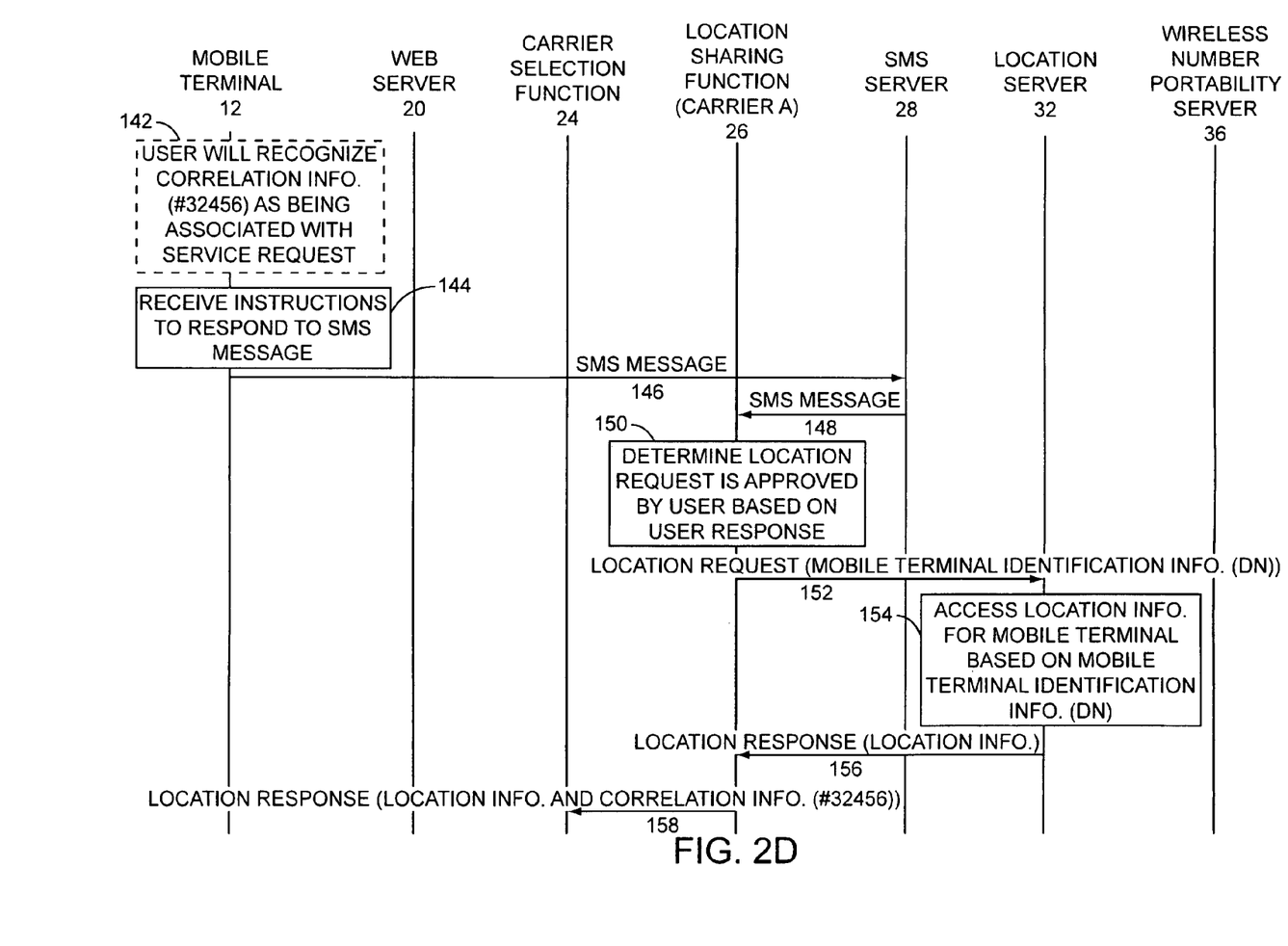
Figure 2E:
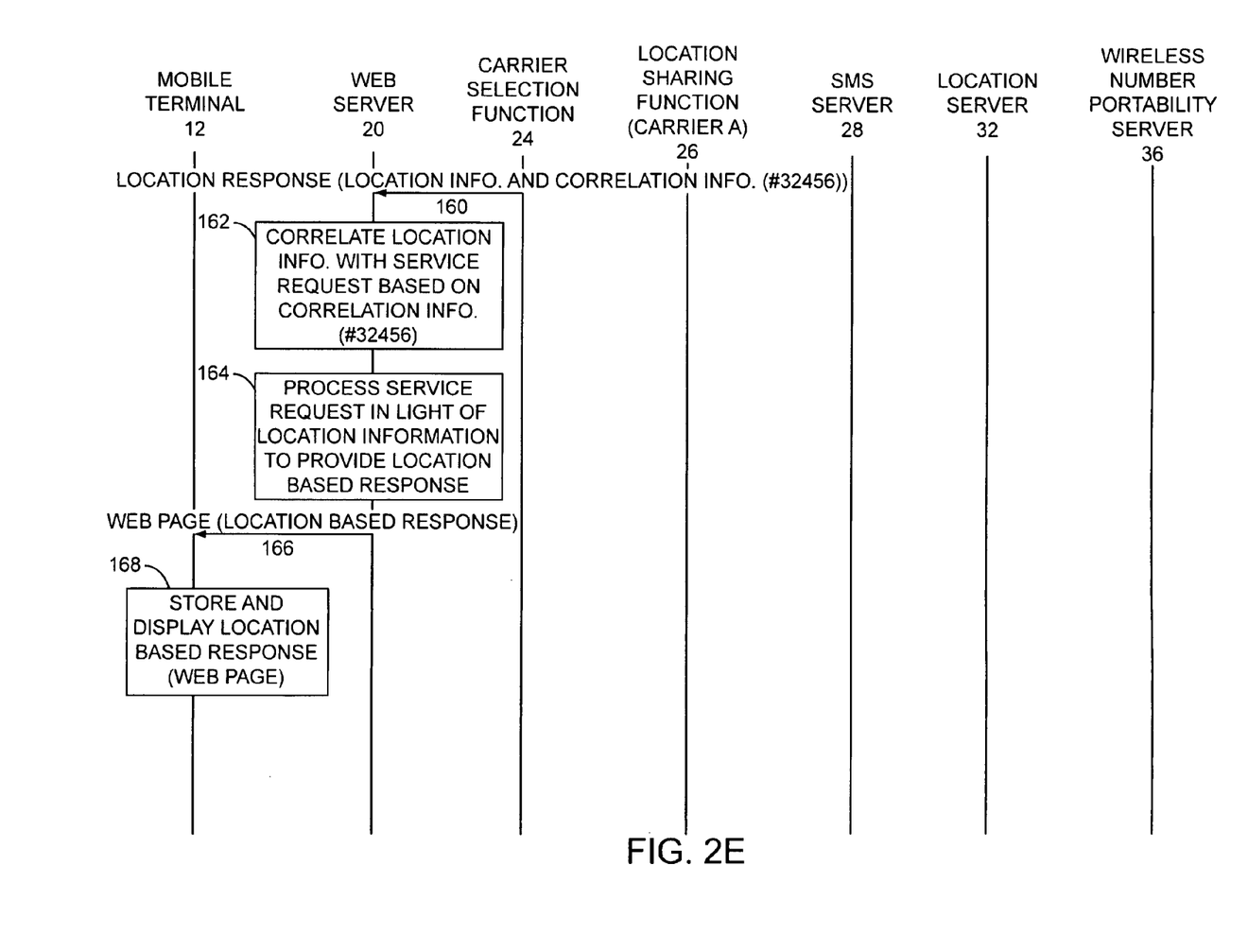

Prior to delving into the details of the present invention and select embodiments thereof, an overview is provided of a mobile communication environment 10, as illustrated in FIG. 1. In the mobile communication environment 10, a number of mobile terminals 12 are configured to communicate with each other via a cellular network 14, which may incorporate various cellular technologies, such as Global System for Mobile Communications (GSM), Code Division Multiple Access (CDMA), or a combination thereof. Those skilled in the art will recognize other cellular technologies that may be used in association with the present invention. Different wireless service providers, or carriers, may provide service to these mobile terminals 12 via the cellular network 14, such that different mobile terminals 12 that are served by various wireless telephone service providers may be served by the cellular network 14. Voice sessions with or between the various mobile terminals 12 may be supported over the cellular network 14. Further, the cellular network 14 may support packet data communications directly or in association with a packet data network 16, which may work in conjunction with the cellular network 14 such that a given mobile terminal 12 can support voice communications over the cellular network 14 and packet-based applications via the packet data network 16 and the cellular network 14. For example, the packet data network 16 may provide a general packet radio service (GPRS) and enhanced data rates for GSM evolution (EDGE) in association with a GSM-based cellular network 14. Similarly, the packet data network 16 may provide an evolution data optimized (EV-DO) service in association with a CDMA-based cellular network 14.

The packet data network 16 may be directly or indirectly connected to the Internet 18 or like packet network, wherein mobile terminals 12 that support data communications may access one or more web servers 20 via the packet data network 16 and the Internet 18, wherein access to the packet data network 16 is provided via the cellular network 14. Accordingly, the mobile terminal 12 may include a mobile browser 22, which is capable of generating and sending a request to a web server 20. In response to receiving the request, the web server 20 will generate a response in light of the request and provide the response to the mobile browser 22 in the form of a web page. The response may then be displayed on the mobile terminal 12 to a user in traditional fashion. In a different embodiment (not shown), the mobile browser 22 may be replaced by other browsers such as commonly available on personal computers. In this embodiment, the interactions with the web server are done via another user device while the location information and location authorization are on the user mobile terminal 12.

For the present invention, the web server 20 is able to obtain location information bearing on the actual or relative location of the mobile terminal 12, and use the location information when generating a response to a request that is received from the mobile browser 22. Accordingly, the response to a request received from the mobile browser 22 may be tailored based on the location of the mobile terminal 12. In one embodiment, the location information is maintained for a mobile terminal 12 with the wireless service provider, or carrier. Since the web server 20 may not know what carrier is serving the mobile terminal 12, the web server 20 may interact with a carrier selection function 24 that is capable of identifying the wireless service provider, or carrier, that is serving the mobile terminal 12.

To obtain the location information for a mobile terminal 12, the web server 20 may send a request to the carrier selection function 24 to identify the carrier serving the mobile terminal 12. The carrier selection function 24 may identify the carrier for the mobile terminal 12 and provide a response identifying the carrier associated with the mobile terminal 12 to the web server 20. In an alternative embodiment, the web server 20 may send a location request to the carrier selection function 24, which will identify the carrier for the mobile terminal 12 and forward the location request to the carrier. In one embodiment, a location sharing function 26, which may be associated with a particular carrier, may receive a location request that is provided by the carrier selection function 24 or from the web server 20. Upon receipt of a request for location information for a given mobile terminal 12, the location sharing function 26 will interact with the mobile terminal 12 to obtain authorization to share the location information of the mobile terminal 12 with the web server 20. In an exemplary embodiment, the location sharing function 26 is configured to deliver a Short Messaging Service (SMS) message to the mobile terminal 12 via an SMS server 28, which is capable of delivering and receiving SMS messages to and from the mobile terminal 12 via the cellular network 14. Authorization to provide the location information to the web server 20 may be provided by the user via the mobile terminal 12 or automatically by the mobile terminal 12, depending on the desired implementation of the present invention. If an SMS message is used to obtain authorization, the mobile terminal 12 may provide an SMS message providing authorization to share the location information with the web server 20 back to the location sharing function 26 via the SMS server 28. To facilitate SMS messaging, the mobile terminal 12 may include an SMS client 30, which is capable of receiving SMS messages, providing the content of received SMS messages to the user, receiving input from the user, and providing corresponding SMS messages back to the location sharing function 26 via the cellular network 14 and the SMS server 28.

Assuming authorization is received from the mobile terminal 12 via an SMS or like message, the location sharing function 26 may access a location server 32, which can provide up-to-date location information for the mobile terminal 12. The location server 32 may retrieve and maintain location information of various types, configurations, or formats. The location information itself may be derived from the identity of a particular cell or base station that is currently serving the mobile terminal 12, coordinates obtained from triangulating a location of the mobile terminal 12 from three or more cells, global positioning satellite (GPS) coordinates retrieved from the mobile terminal 12, or the like. In the case of GPS coordinates, the mobile terminal 12 may be equipped with a GPS receiver 34 that is capable of obtaining precise GPS parameters that correspond to the current location of the mobile terminal 12, and provide these parameters or coordinates derived therefrom to the location server 32 in a direct or indirect fashion. Notably, the location information stored by the location server 32 may represent virtually any type of information that identifies a location or that is sufficient for a location to be derived therefrom. As such, the location information that is ultimately provided to the web server 20 may correspond to a specific or general location or may be information from which a specific or general location may be derived. Accordingly, when the web server 20 receives location information, it may be able to immediately use the location information in association with the original request from the mobile terminal 12, or it may need to process the location information to derive general or specific information therefrom before processing the initial request that is received by the mobile terminal 12.

Preferably, the MSISDN or other mobile terminal identification information is obtained from the mobile terminal 12 by the web server 20 prior to receiving or in association with receiving a service request. The MSISDN may be sent to the carrier selection function 24 to help identify the carrier that is serving the mobile terminal 12, to the location sharing function 26, and to the location server 32. The location sharing function 26 may use the MSISDN to send SMS messages to the mobile terminal 12, as well as retrieve corresponding location information for the mobile terminal 12 from the location server 32.

With wireless number portability, a given MSISDN may have been ported from one carrier to another. In order to query the carrier currently providing service for the mobile MSISDN, the carrier selection function 24 may perform a query with the wireless number portability server 36 to identify the current carrier for the mobile MSISDN.

The following communication flow provides an exemplary process for implementing one embodiment of the present invention. With reference to FIGS. 2A-2E, assume the user of mobile terminal 12 initially opens the mobile browser 22 of the mobile terminal 12 (step 100) and enters a request for a location based service. The mobile terminal 12 will generate a corresponding service request for the location based service (step 102) and will send the service request to the web server 20 via the packet data network 16 and the Internet 18 (step 104). Notably, the service request is identified as a request for a location based service. The request may or may not include an indication that the primary request should be based on or limited by location. If the request is not location specific when made by the user, the web server 20 may recognize the request as being one that is capable of being limited by location or that would benefit by being limited by location, and provide results accordingly. Alternatively, the user may specifically indicate in the web query itself or by checking or marking an appropriate box to use current location information when responding to the web query. In this example, assume the web query specifies the name of a national restaurant chain "National Pizza," which has multiple locations local to the user and throughout the country.

Upon receiving the service request, the web server 20 may recognize that the service request is for a location based service, due to the nature of the web query (step 106). The web server 20 will next generate correlation information (#32456) to assist with the location retrieval process, and in particular an authorization process that is required prior to being able to access the location information for the mobile terminal 12 (step 108). The correlation information may be generated in a systematic or random fashion. The web server 20 may then generate a web page with the correlation information, as well as a request for the mobile terminal identification information (DN) of the mobile terminal 12 (step 110A). Alternatively, the web server 20 may generate a web page with correlation information and the actual mobile terminal identification information, along with a request to confirm the mobile terminal identification information (DN) included in the web page (step 110B). In the first instance, the web server 20 is asking the mobile terminal 12 or the user to provide the mobile terminal identification information. In the second instance, the web server 20 has already received the mobile terminal identification information, perhaps in a prior web session, and is asking the mobile terminal 12 or the user to confirm that the mobile terminal identification information on record is accurate. In either instance, the web server 20 will provide the web page with the correlation information and either the request for the mobile terminal identification information or a request to confirm the mobile terminal identification information to the mobile terminal 12 (step 112).

The mobile terminal 12 will automatically or in response to user interaction provide or confirm the mobile terminal identification information (DN) for the mobile terminal 12 (step 114), and preferably store and display the correlation information when displaying the web page to the user (step 116). The mobile terminal 12, and in particular the mobile browser 22, will send a response with the mobile terminal identification information or a confirmation of the mobile terminal identification information to the web server 20 (step 118). The web server 20 will receive the mobile terminal identification information (DN) or confirmation thereof (step 120). The web server 20 may then generate a location request and send the location request to the carrier selection function 24 (step 122). Notably, the location request may include the mobile terminal identification information that was received or confirmed by the mobile terminal 12, along with the correlation information (#32456).

The carrier selection function 24 may initially determine whether or not the mobile terminal was ported to a different carrier by sending a number portability request to the wireless number portability server (step 124), which will identify the carrier that is serving the mobile terminal 12, perhaps based on the MSISDN (step 126). The wireless number portability server 36 will then provide a portability response that identifies the serving carrier back to the carrier selection function (step 128). The carrier selection function 24 will then identify the carrier, in this instance Carrier A, that is serving the mobile terminal 12 based on the mobile terminal identification information (DN) that was either provided or confirmed by the mobile terminal 12 or provided by the wireless number portability server 36, as the case may be (step 130). Once the carrier that is serving the mobile terminal 12 is identified, the location request may be forwarded to the location sharing function 26 of Carrier A (step 132).

Notably, in this embodiment the carrier selection function 24 is capable of identifying the serving carrier for the mobile terminal 12 and forwarding the location request that was received from the web server 20 to the location sharing function 26 of the serving carrier. In other embodiments, the carrier selection function 24 may be configured to provide information that identifies the carrier back to the web server 20, wherein the web server 20 will send the location request to the location sharing function 26 of the serving carrier. In either instance, the location request is deemed to have been provided by the web server 20 directly or indirectly via the carrier selection function 24 to the location sharing function 26 of the serving carrier.

The location request may include the mobile terminal identification information, as well as the correlation information (#32456), which was provided by the web server 20. The location sharing function 26 will recognize that the location request is a request for location information for the mobile terminal 12, but prior to accessing the location information for the mobile terminal 12, the location sharing function 26 must obtain authorization from the user associated with the mobile terminal 12 to do so. In this embodiment, the location sharing function 26 is configured to send a message requesting authorization to the mobile terminal 12. Although various messaging techniques may be employed, SMS messaging techniques are used in this example. Those skilled in the art will recognize that other messaging techniques, such as instant messaging, email, proprietary, or like messaging techniques may be employed to facilitate an interaction between the mobile terminal 12 and the location sharing function 26 to obtain the authorization needed to provide location information to the web server 20.

Continuing with the example, assume the location sharing function 26 of Carrier A formats an SMS message that includes text requesting permission to share location information associated with the mobile terminal 12 with the web server 20 (step 134). Preferably, the location sharing function 26 will include the correlation information (#32456) in the SMS message as described above. The web server 20 also provided the correlation information (#32456) to the user via the mobile browser 22. When the user receives the same correlation information in the SMS message provided from the location sharing function 26, the user or the mobile terminal 12 can compare the correlation information that was received from the web server 20 and recognize that the request for the location information is associated with the service request being fulfilled by the web server 20. By providing this correlation, the user of the mobile terminal 12 can be reasonably assured that their location information, and in particular the location information associated with the mobile terminal 12, is only being provided to web servers 20 that are working on known service requests.

To provide the SMS message to the mobile terminal 12, the location sharing function 26 may address the SMS message to the mobile terminal identification information (DN) and deliver it toward the mobile terminal 12. As illustrated, the SMS message may be initially delivered to the SMS server 28 (step 136), which will forward the SMS message via the cellular network 14 to the SMS client 30 of the mobile terminal 12 (step 138). The mobile terminal 12 may then display the SMS message along with the included correlation information (#32456) to the user (step 140). The user will recognize the correlation information (#32456) as being the same as the correlation information (#32456) provided by the web server 20, and as being associated with the initial service request (step 142). To provide authorization, the mobile terminal 12 may receive instructions to respond to the SMS message from the user or an application running on the mobile terminal 12 (step 144), and then send the SMS message toward the location sharing function 26. As illustrated, the SMS message is delivered via the cellular network 14 to the SMS server 28 (step 146), which will forward the SMS message to the location sharing function 26 (step 148). The content of the reply SMS may optionally include the duration of the authorization (e.g. 5, for 5 minutes).

The location sharing function 26 will analyze the SMS message and determine that the request to provide location information to the web server 20 is approved (step 150), and may forward the location request, including the mobile terminal identification information (DN), to the location server 32 (step 152). In response to the location request, the location server 32 may access or retrieve through network interactions the location information for the mobile terminal 12 based on the mobile terminal identification information (DN) that was provided in the location request (step 154) and provide the location information for the mobile terminal 12 in a location response, which is sent back to the location sharing function 26 (step 156). The location sharing function 26 may provide the location response directly to the web server 20, or as illustrated, back to the carrier selection function 24 (step 158), which will forward the location response to the web server 20 (step 160). Notably, the location response provided by the location sharing function 26, and perhaps by the location server 32, may also include the correlation information (#32456). As such, the web server 20 will receive the location information and the associated correlation information. Based on the correlation information, the web server 20 will correlate the location information with the service request that was originally provided by the mobile terminal 12 (step 162). The web server 20 will then process the service request in light of the location information to provide a location based response (step 164).

As indicated above, the location information provided by the location server 32 may be in a form that is readily and immediately usable by the web server 20 in association with the initial query provided in the service request. If not, the web server 20 may access another server (not shown) to derive a general or specific location that may be used in association with the web query to provide the location based response. Once the location based response is determined, a web page with the location based response may be provided to the mobile browser 22 of the mobile terminal 12 (step 166). The mobile terminal 12 will then store and display the location based response, such as in the content of a web page, to the user (step 168).

In the example of the web query corresponding to "National Pizza," the location information of the mobile terminal 12 may be retrieved by the web server 20 upon receiving the service request. Once the location information for the mobile terminal 12 is received, the web server 20 may provide a search, such as a web search, for "National Pizza" with the further limitation of the location information. As such, the web server 20 may limit the search for "National Pizza" to the corresponding location information associated with the mobile terminal 12. The search may identify one or more local "National Pizza" locations, and information associated therewith, such as a map showing the locations, driving directions to the locations based on the location of the mobile terminal 12, addresses, contact information, and the like. The web server 20 may also obtain general or targeted advertising as well as information related to similar businesses or other businesses in the area of interest. As a result, the location based response may include information for National Pizza restaurants that are located in or proximate to a location represented by the location information of the mobile terminal 12 as well as any of the other information identified above.

Although the illustrated embodiment is readily implementable in current wireless communication environments, those skilled in the art will recognize other techniques for obtaining authorization from a mobile terminal 12 through various messaging techniques, which may or may not involve the use of the packet data network 16 and Internet 18. For example, the location sharing function 26 may employ an email service or a packet-based instant messaging service that is supported at least in part via the packet data network 16. Further, in fourth generation wireless communication networks, both voice and data services will be provided over a packet architecture. In these scenarios, the underlying transport mechanism or messaging technique may vary from one implementation to another. Regardless of implementation, a location sharing function 26 or the like is capable of obtaining authorization to share location information for the mobile terminal 12 outside of a web session for which the location information may be used. Upon receiving authorization, the location sharing function 26 may either retrieve location information and provide it to the web server 20, or allow the web server 20 to access the location information directly. In any of these embodiments, the location information that is retrieved may expire after a single use, after a certain number of uses, or after a certain amount of time has passed. Further, the web server 20 may be similarly limited in how often information may be accessed.

Figure 3:
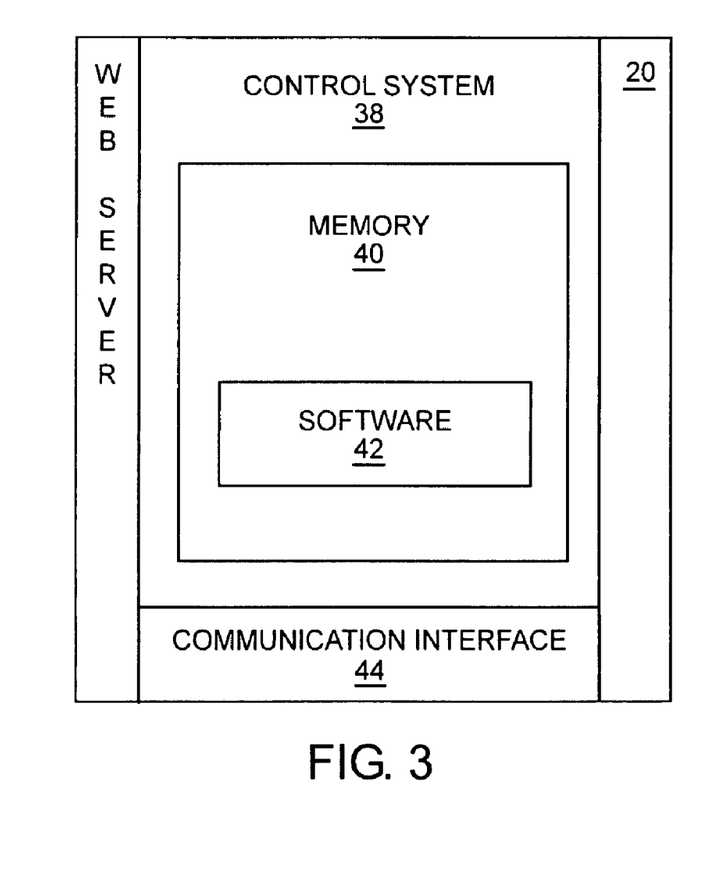
FIG. 3 is a block representation of a web server according to one embodiment of the present invention.

With reference to FIG. 3, a block representation of a web server 20 is illustrated according to one embodiment of the present invention. The web server 20 may include a control system 38 having sufficient memory 40 for the requisite software 42 to operate as described above. The control system 38 may also be associated with a communication interface 44 to facilitate communications with various entities in the wireless communication environment 10.

Figure 4:
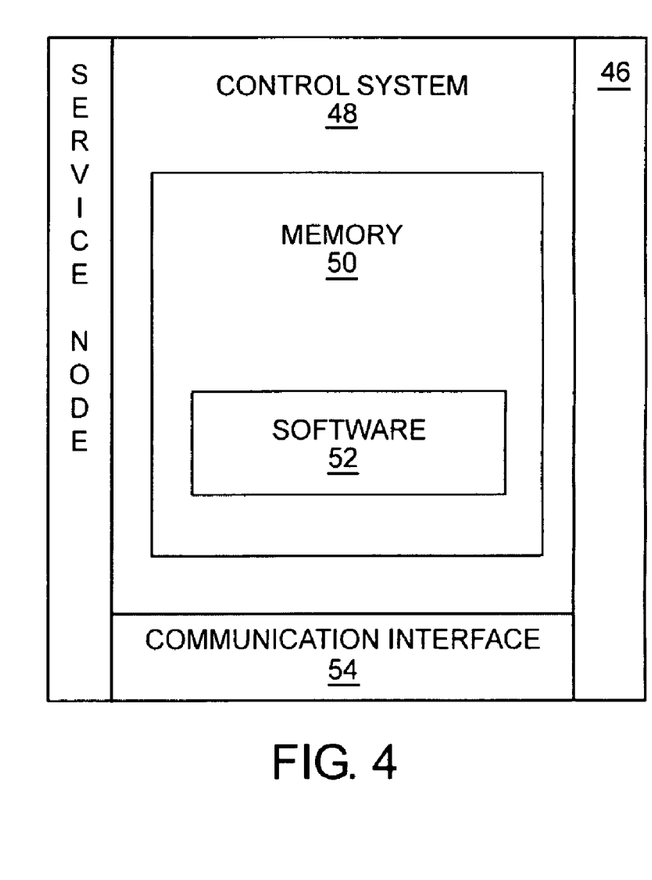
FIG. 4 is a block representation of a service node according to one embodiment of the present invention.

With reference to FIG. 4, a block representation of a service node 46 is illustrated according to one embodiment of the present invention. The service node 46 may include a control system 48 having sufficient memory 50 for the requisite software 52 to operate as described above. The control system 48 may also be associated with a communication interface 54 to facilitate communications with various entities in the wireless communication environment 10. The service node 46 may represent or support the functionality of various functions and entities as illustrated in FIG. 1. For example, the service node 46 may implement the functionality or represent the carrier selection function 24, the location sharing function 26, the location server 32, and the like.

Figure 5:
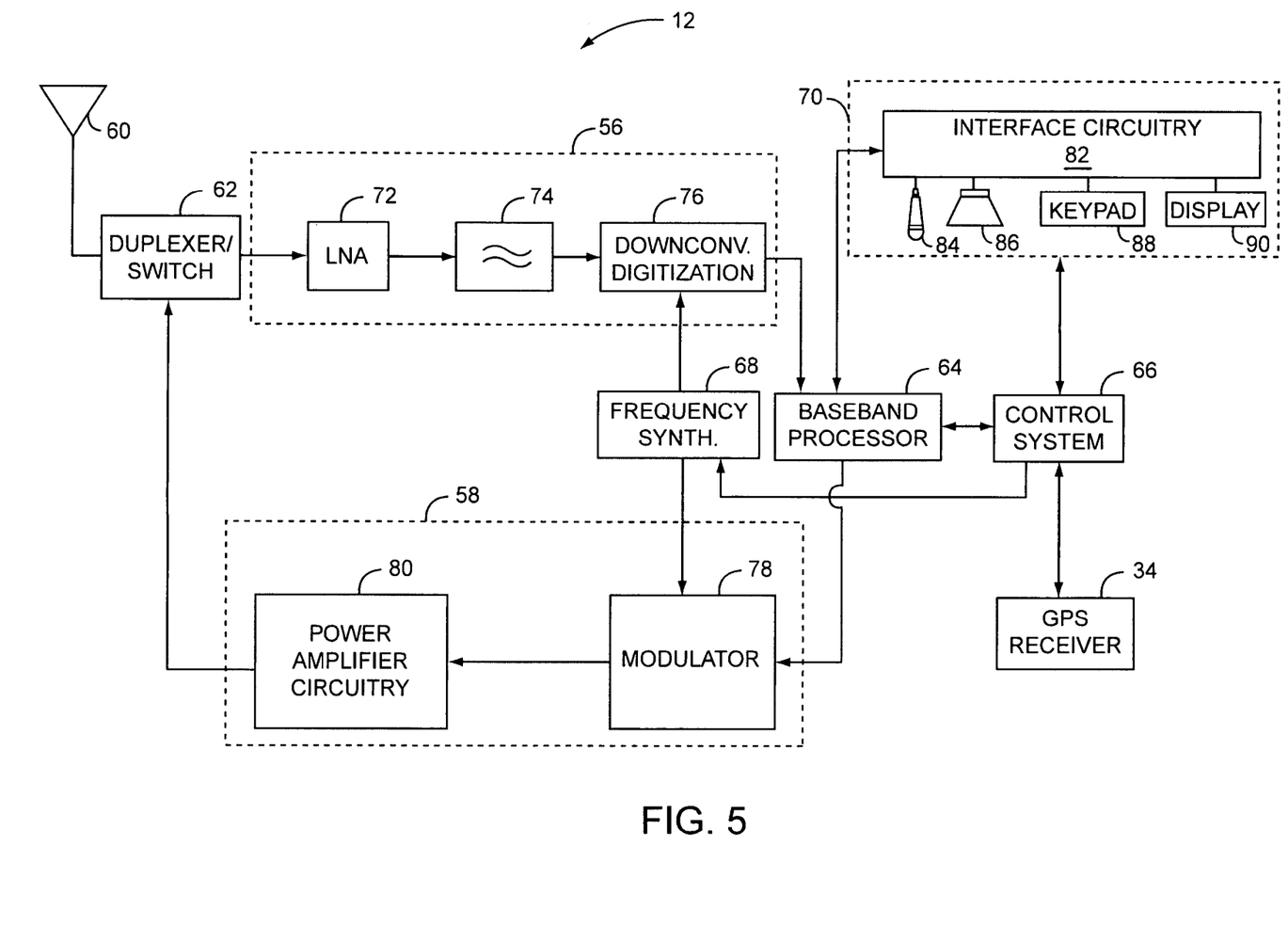
FIG. 5 is a block representation of a mobile terminal according to one embodiment of the present invention.

The basic architecture of the mobile terminal 12 is represented in FIG. 5 and may include a receiver front end 56, a radio frequency transmitter section 58, an antenna 60, a duplexer or switch 62, a baseband processor 64, a control system 66, a frequency synthesizer 68, and an interface 70. The receiver front end 56 receives information bearing radio frequency signals from one or more remote transmitters provided by a base station. A low noise amplifier 72 amplifies the signal. A filter circuit 74 minimizes broadband interference in the received signal, while downconversion and digitization circuitry 76 downconverts the filtered, received signal to an intermediate or baseband frequency signal, which is then digitized into one or more digital streams. The receiver front end 56 typically uses one or more mixing frequencies generated by the frequency synthesizer 68. The baseband processor 64 processes the digitized received signal to extract the information or data bits conveyed in the received signal. This processing typically comprises demodulation, decoding, and error correction operations. As such, the baseband processor 64 is generally implemented in one or more digital signal processors (DSPs).

On the transmit side, the baseband processor 64 receives digitized data, which may represent voice, data, or control information, from the control system 66, which it encodes for transmission. The encoded data is output to the transmitter 58, where it is used by a modulator 78 to modulate a carrier signal that is at a desired transmit frequency. Power amplifier circuitry 80 amplifies the modulated carrier signal to a level appropriate for transmission, and delivers the amplified and modulated carrier signal to the antenna 60 through the duplexer or switch 62.

A user may interact with the mobile terminal 12 via the interface 70, which may include interface circuitry 82 associated with a microphone 84, a speaker 86, a keypad 88, and a display 90. The interface circuitry 82 typically includes analog-to-digital converters, digital-to-analog converters, amplifiers, and the like. Additionally, the interface circuitry 82 may include a voice encoder/decoder, in which case it may communicate directly with the baseband processor 64. The microphone 84 will typically convert audio input, such as the user's voice, into an electrical signal, which is then digitized and passed directly or indirectly to the baseband processor 64. Audio information encoded in the received signal is recovered by the baseband processor 64, and converted by the interface circuitry 82 into an analog signal suitable for driving the speaker 86. The keypad 88 and display 90 enable the user to interact with the mobile terminal 12, input numbers to be dialed, address book information, or the like, as well as monitor call progress information.

The control system 66 will include the requisite memory and software to provide the mobile browser 22, the SMS client 30 or like messaging client, as well as any other necessary operations to operate and control the mobile terminal 12. Further, the control system 66 may be associated with the GPS receiver 34 where GPS signals are received and processed to obtain GPS parameters, which may be processed by the control system 66 to generate location coordinates. The control system 66 may pass the GPS parameters or location coordinates derived therefrom directly or indirectly to the location server 32 associated with the carrier that is serving the mobile terminal 12.

Those skilled in the art will recognize improvements and modifications to the preferred embodiments of the present invention. All such improvements and modifications are considered within the scope of the concepts disclosed herein and the claims that follow.

What is claimed is:

1. A method for facilitating delivery of location information for a mobile terminal from a wireless telephone service provider to a web server, the method comprising:
    receiving a location request at a location authorization function provided by the wireless telephone service provider in response to a web server requesting location information for a mobile terminal, wherein the location authorization function is remote from the mobile terminal;
    effecting delivery of an authorization request from the location authorization function to the mobile terminal requesting authorization to deliver the location information for the mobile terminal to the web server;
    receiving, at the location authorization function, from the mobile terminal an authorization response indicative of whether the authorization has been provided to deliver the location information for the mobile terminal to the web server; and
    when the authorization has been provided to deliver the location information for the mobile terminal to the web server, effecting delivery of the location information for the mobile terminal from the location authorization function to the web server; and
    wherein the location request includes correlation information that was also provided by the web server to the mobile terminal, and wherein the authorization request includes the correlation information such that the mobile terminal or a user associated therewith can associate the authorization request with a service request provided to the web server based on the correlation information.

2. The method of claim 1 wherein the web server is configured to use the location information for the mobile terminal in providing a response to a service request that was sent to the web server by the mobile terminal.

3. The method of claim 1 wherein effecting delivery of the location information for the mobile terminal to the web server comprises:
    requesting the location information for the mobile terminal from a location entity that determines the location information for the mobile terminal;
    receiving the location information for the mobile terminal from the location entity; and
    delivering the location information toward the web server.

4. The method of claim 1 wherein the location request is received from a carrier selection function, which is adapted to:
    receive a request for the location information from the web server;
    identify a wireless telephone service provider associated with the mobile terminal from a plurality of wireless telephone service providers;
    generate the location request for the mobile terminal; and
    direct the location request toward the wireless telephone service provider, which will effect delivery of the authorization request, receive from the mobile terminal the authorization response, and effect delivery of the location information for the mobile terminal.

5. The method of claim 4 wherein effecting delivery of the location information for the mobile terminal to the web server comprises sending a location response comprising the location information for the mobile terminal to the carrier selection function, which is configured to send the location information for the mobile terminal to the web server.

6. The method of claim 1 wherein the location request is received substantially directly from the web server.

7. The method of claim 6 wherein effecting delivery of the location information for the mobile terminal to the web server, comprises sending a location response comprising the location information for the mobile terminal to the web server.

8. The method of claim 1 wherein the authorization request is delivered to the mobile terminal and the authorization response is received from the mobile terminal without involving the web server.

9. The method of claim 1 wherein the location request is provided with mobile terminal identification information that identifies the mobile terminal, and wherein delivery of the authorization request is effected using the mobile terminal identification information.

10. The method of claim 9 wherein the location information for the mobile terminal is obtained based on the mobile terminal identification information.

11. The method of claim 1 wherein the location request is provided with mobile terminal identification information that identifies the mobile terminal, and wherein the location information for the mobile terminal is obtained based on the mobile terminal identification information.

12. The method of claim 1, wherein the location request is further provided with mobile terminal identification information that identifies the mobile terminal and wherein delivery of the authorization request is effected using the mobile terminal identification information.

13. The method of claim 1 wherein the authorization request is delivered to the mobile terminal and the authorization response is received from the mobile terminal using short messaging service (SMS) messages.

14. The method of claim 1 wherein the authorization request is delivered to the mobile terminal and the authorization response is received from the mobile terminal using instant messaging (IM) messages.

15. The method of claim 1 wherein the authorization request is delivered to the mobile terminal and the authorization response is received from the mobile terminal using email messages.

16. The method of claim 1 wherein the location information for the mobile terminal bears on a current location of the mobile terminal.

17. The method of claim 1 wherein the location information is or is derived from one of a group comprising GPS parameters received by the mobile terminal, an identification of a cell that is serving the mobile terminal, and triangulation parameters derived from a plurality of cells that are within communication range of the mobile terminal.

18. The method of claim 1 wherein effecting delivery of the authorization request, receiving from the mobile terminal the authorization response, and effecting delivery of the location information for the mobile terminal is provided by at least one service node controlled by a wireless telephone service provider that serves the mobile terminal, and wherein the web server is not controlled by the wireless telephone service provider.

19. A system for facilitating delivery of location information for a mobile terminal from a wireless telephone service provider to a web server comprising:
at least one communication interface; and
a control system associated with the at least one communication interface and adapted to:
 receive a location request at a location authorization function provided by the wireless telephone service provider in response to a web server requesting location information for a mobile terminal;
 effect delivery from the location authorization function to the mobile terminal of an authorization request requesting authorization to deliver the location information for the mobile terminal to the web server;
 receive, at the location authorization function, from the mobile terminal an authorization response indicative of whether the authorization has been provided to deliver the location information for the mobile terminal to the web server; and
 effect delivery of the location information for the mobile terminal from the location authorization function to the web server in response to receiving the authorization to deliver the location information; and
 wherein the location request includes correlation information that was also provided by the web server to the mobile terminal, and wherein the authorization request is delivered with the correlation information such that the mobile terminal or a user associated therewith can associate the authorization request with a service request provided to the web server based on the correlation information.

20. The system of claim 19 wherein the web server is configured to use the location information for the mobile terminal in providing a response for a service request that was sent to the web server by the mobile terminal.

21. A method for operating a web server comprising:
receiving a service request comprising a web query from a user web browser;
generating correlation information associated with the service request;
providing the correlation information to the user web browser;
sending a location request for location information for a mobile terminal, wherein the location request comprises the correlation information and the location information for the mobile terminal is maintained by a wireless telephone service provider associated with the mobile terminal;
receiving the location information for the mobile terminal, wherein the location information was obtained from the wireless telephone service provider and the wireless telephone service provider used the correlation information to obtain authorization to provide the location information for the mobile terminal via a communication with the mobile terminal;
processing the web query in light of the location information to provide a location based result; and
delivering the location based result to the user web browser.

22. The method of claim 21 wherein the user web browser resides on the mobile terminal and the location-based result is provided in a web page.

23. The method of claim 21 further comprising:
obtaining mobile terminal identification information identifying the mobile terminal from the mobile terminal; and
providing the mobile terminal identification information with the location request.

24. The method of claim 21 further comprising:
confirming mobile terminal identification information identifying the mobile terminal via a communication with the mobile terminal; and
providing the mobile terminal identification information with the location request after confirming the mobile terminal identification information.

* * * * *